INVENTOR
Harry W. Harrell

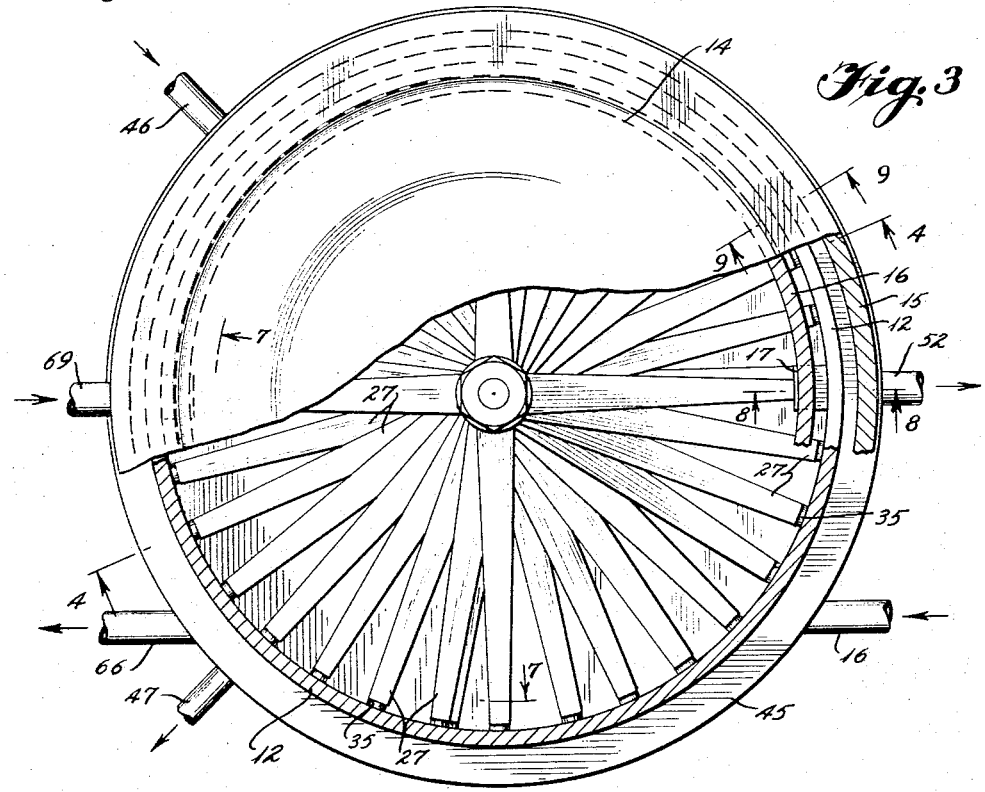
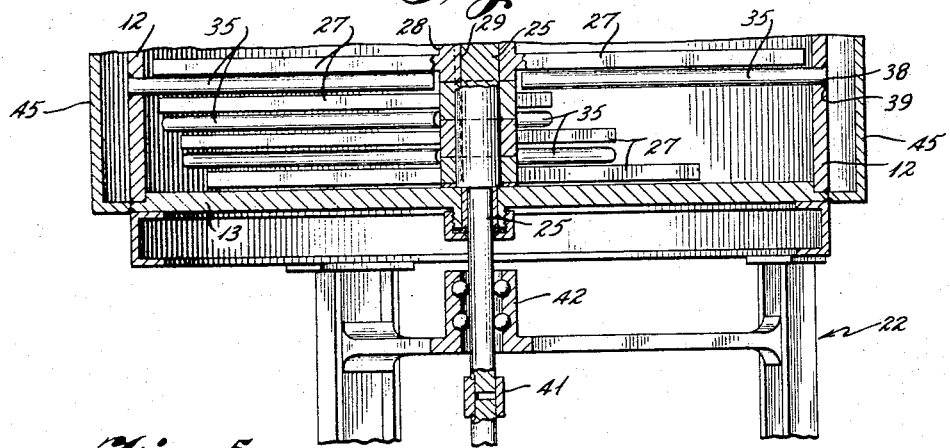
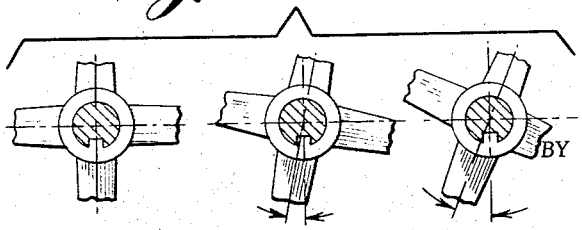
INVENTOR
Harry W. Harrell
ATTORNEY

Sept. 5, 1967 H. W. HARRELL 3,340,071
METHOD FOR CONCENTRATING LIQUID, MORE PARTICULARLY
CITRUS JUICES, AND FOR THE INACTIVATION OF
ENZYME CONTENTS OF SUCH JUICES
Filed Aug. 29, 1963 3 Sheets-Sheet 3
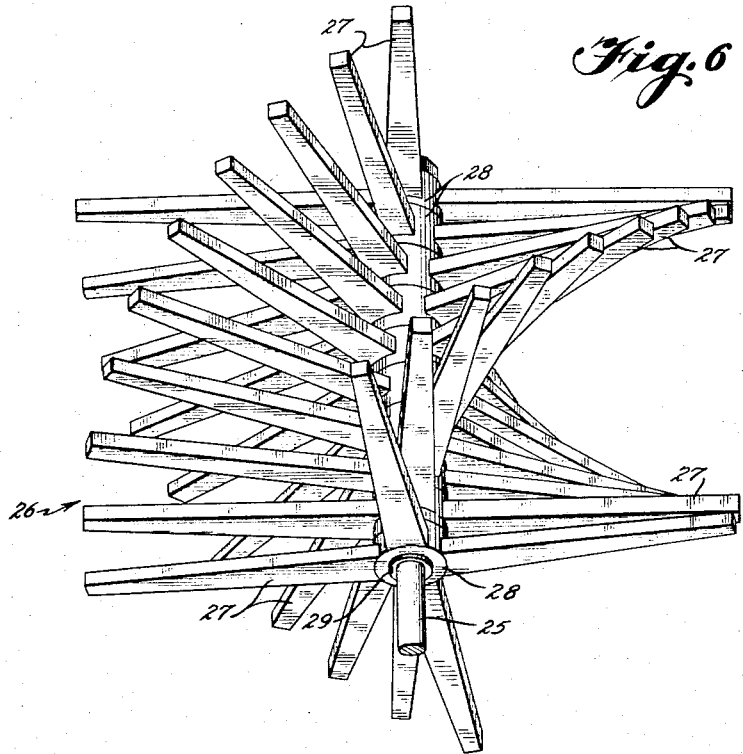
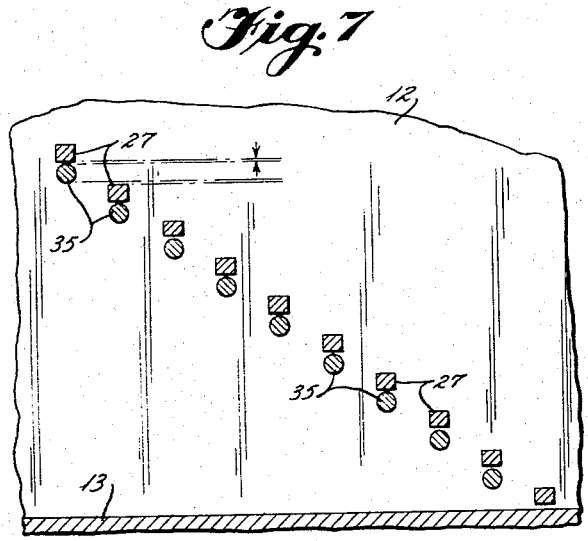
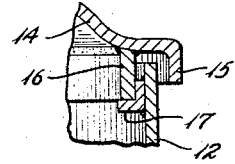
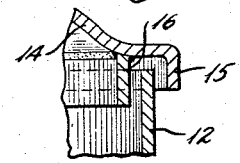
INVENTOR
Harry W. Harrell
BY
ATTORNEY United States Patent Office 3,340,071
Patented Sept. 5, 1967

3,340,071
METHOD FOR CONCENTRATING LIQUID, MORE PARTICULARLY CITRUS JUICES, AND FOR THE INACTIVATION OF ENZYME CONTENTS OF SUCH JUICES
Harry W. Harrell, 2204 Newtown Hwy., Lakeland, Fla.
Filed Aug. 29, 1963, Ser. No. 300,140
8 Claims. (Cl. 99—205)

ABSTRACT OF THE DISCLOSURE

A method for concentrating citrus juice which consists of agitating the juice without the application of external heat, instead utilizing the heat produced by the friction of the agitator moving through the liquid so that the combination of increased temperature of the liquid and reduction of pressure resultant from moving the agitator through the liquid will remove the more volatile constituents thereof.

---

Figures 1, 2:
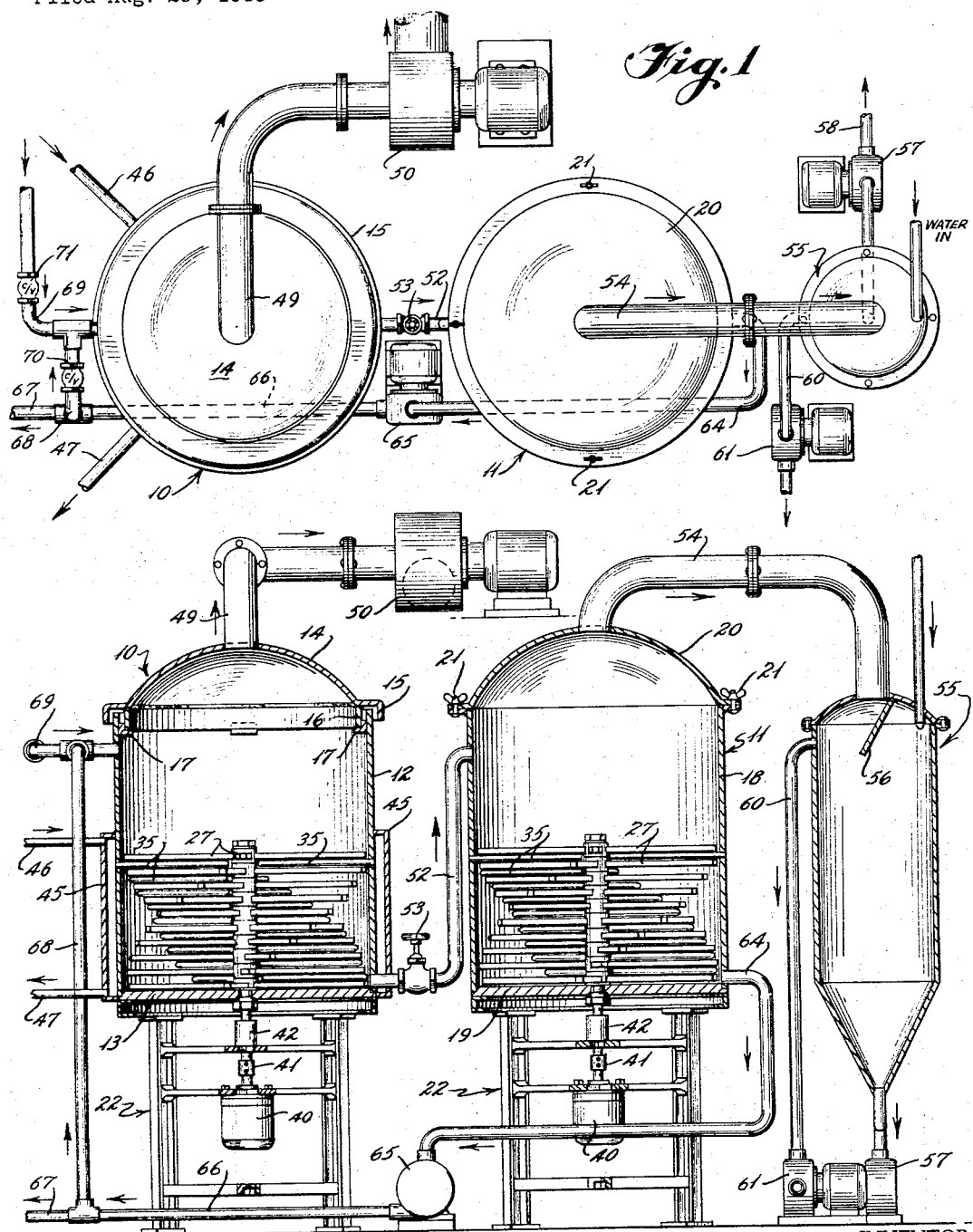

While certain aspects of the present inventive concept, may be broadly applicable in the general field of the concentration of liquids and/or in the separation of liquid constituents or groups thereof, from other liquid constituents or groups thereof, the present invention is more particularly concerned, both as to apparatus and method, with the concentration of citrus juices.

It has been found that by vigorous agitation of confined liquids by internal mechanical means, vaporization of certain constituents, emulsifications and like combinations of liquids will occur. Vigorous agitation or turbulence generated by internal mechanical means will produce liquid vapor which may include droplets, atomized liquid and free floating aresol particles, as well as volatilized portions of the lighter constituents of liquid combinations, dispersals, or suspensions. While the nature and amount of vapor produced by mechanical agitation and turbulence of the body of a liquid will, of course vary with the pressure applied to the liquid within a closed receptacle, as well as the type of agitation employed, it has been found that with the present apparatus considerable vaporization, both by volatilization and mechanical atomization will occur under atmospheric pressure. In the treatment of citrus juices the vigorous internal mechanical agitation and resultant turbulence produces a water vapor which may be drawn off from the body of the liquid to leave therein a more concentrated solution of the juices, the constituents of which are heavier and less volatile than the water content of the natural juices.

In the present method and by use of the present apparatus internal heat is generated through the frictional action of contact with the liquid and the turbulence produced by rotating blades preferably operating between stationary blades. The relation of the blades being somewhat in the fashion of a maze to force the fluid in a tortuous turbulent path whereby the skin friction of the liquid in contact with such mechanical means produces the elevation of temperature of the liquid. It is to be noted that in accordance with the well-known principle of fluid motivation mechanical impellers produce a localized reduction of pressure behind the blades. Thus, as the front or leading face of a rotating impeller pushes forwardly the fluid in front of the blade, substantially reduced pressure is effected behind the blade to provide for the inflow of fluid to compensate for that which has moved forward. In the present device this localized reduction of pressure in combination with the increased temperature produced by skin friction provides a localized continuously moving evaporation zone or zones where the heat and pressure are such as to induce distillation despite overall pressures and temperatures well below the temperatures and pressures required for conventional distillation. Thus the chamber pressure may be atmospheric and the mass temperature relatively low despite which volatilization will occur.

With respect to the concentration of citrus juices, deleterious effect upon the character of the juice such as taste, aroma and appearance, frequently ensues from evaporation by the application of external heat to elevate the mass temperature of the total liquid to the evaporation point, reduced pressure having been employed to minimize such required temperature. It has been suggested that such destruction of the nascent qualities of the juices by evaporation in a "cooking" method permits the enzymes and micro-organisms to affect the pectin content whereby it may be precipitated, thus contributing to the disqualification of such concentrate from wide areas of the market. It has further been suggested that by a brief subjection of at least portions of the natural juices, while in motion to vaporizing temperatures by externally applied heat and the instant co-mingling of such portions with the body of the juice, will be effective to immunize the enzymes and micro-organisms within acceptable limits. The present method and the operation of the present apparatus may produce a like inactivation, neutralization, or pacification of the enzyme and/or micro-organism effect on the pectin to produce a citrus juice concentrate free of previously encountered objections.

Thus, it is among the primary objects of the present invention to provide a novel method of and means for concentrating liquids. It is an object of the invention to provide a novel and improved method of and means for concentrating liquids without the application of external heat. Therewith it is an object of the invention to provide for the concentration of liquids through purely mechanical means. More specifically, it is an object of the invention to provide a novel and improved method of and means for the concentration of citrus juices with a minimum of destruction of their nascent qualities. Numerous other objects, features and advantages of the present invention will be apparent from a consideration of the following specification taken in conjunction with accompanying drawings, in which FIG. 1 is a plan view of apparatus constructed in accordance with the present invention, FIG. 2 is an elevation, with parts in section, of the apparatus of FIGURE 1, FIG. 3 is an enlarged plan view of one of the evaporator tanks, parts being broken away for clarity, FIG. 4 is a fragmentary section of the line 4—4 of FIGURE 3, FIG. 5 is a fragmentary view illustrating the angular displacement of successive flights or levels of agitator bars, FIG. 6 is a fragmentary perspective of one of the agitator shafts illustrating the arrangement of bars thereon, FIG. 7 is a fragmentary layout on the line 7—7 of FIGURE 3 illustrating the arrangement of the movable and stationary agitator bars, and FIGS. 8 and 9 are enlarged sections on the lines 8—8 and 9—9 of FIGURE 3, illustrating the mounting of the lid on the wall of the chamber.

That form of the present apparatus here shown by way of illustration, includes a pair of chambers 10 and 11. The chamber 10 includes a cylindrical side wall 12, bottom 13 and a domed top 14. A depending marginal flange 15 spaced from a depending inner flange 16 of the top 14 rests on spaced lugs 17 located within the upper end of the side wall 12. The upper edge of the side wall 12 is spaced from the under side of the top 14, as clearly indicated in FIGURES 8 and 9, in order that air may freely enter. Similarly the chamber 11 includes a cylindrical side wall 18, bottom 19 and cover 20. Preferably the cover 20 seatingly engages the upper edge of wall 18 by fastening means 21. The chambers 10 and 11 may be mounted on suitable supports or bases 22.

Within each of the evaporator chambers is an agitator assembly which includes a shaft 25 and a multiplicity of flights 26 mounted thereon. Each flight 26 includes a multiple of impeller bars 27, each flight being arranged in the same plane at about 90 degrees apart. The bars 27 are mounted on collars 28 having keys 29 by means of which the collars are fixed for rotation with the shaft 25.

The stationary portion of the agitator assembly includes a multiplicity of flights of fingers 35 extending radially inward of the wall 12 to the proximity of the collars 28. The fixed flights are arranged similarly to the movable flights of FIGURE 6. Thus, there are four fixed rods for each fixed flight, the latter being spaced apart axially a distance to receive a movable flight therebetween, and the succeeding flights are angularly disposed like those of the movable bars. FIGURE 7 is a layout of the cylinder wall with the movable and fixed flights indicated in section. In one position of rotation of the movable flights from the bars 27 are directly over the rods 35 which project from the cylinder wall. In order to mount the rods on the cylinder wall firmly, the rods may extend through openings 38 in such wall and be brazed or welded thereto at the exterior as indicated at 39. For driving the shaft 25 a motor 40 is provided, mounted on the frame 22 to drive the shaft 25 through coupling 41. Suitable bearings 42 are provided. The agitator assembly of the second tank 11 is similar to that of the first tank 10 and consequently need not be specifically described. In order to avoid the possibility of excess temperature, a jacket 45 is provided around the side walls 12 of the chamber 10 and conduits 46 and 47 are provided by means of which cooling water or other liqiud may be applied to the chamber.

Fresh liquid to be treated by the present method and by the present apparatus is supplied to the chamber 10 from the conduit 69 and therewith, or independently thereof partially processed liquid may be returned from the chamber 11 to the chamber 10 through conduit 68. Vigorous agitation and turbulence of the liquid in chamber 10 by rotation of the bars 27 and the consequent localized temperature elevation, produces a liquid vapor of light and more volatile constituents of the liquid over the liquid body in the chamber 10, in the manner aforesaid. That is, the vapor may be liquid droplets, atomized liquid, aerosol liquid particles or volatilized liquid. In the case of citrus juice the vapor is primarily, if not entirely simple water vapor. It is to be noted that while the rotation of the fingers or blades produces localized heat through liquid skin friction and that in the rarified pressure in the wake of the fingers, evaporation may enure, the total heat generated will increase the overall heat of the liquid body, hence the cooling jacket for chamber 10.

The vapor produced in chamber 10 may be drawn off through conduit 49 by the action of pump 50. In the case of citrus fruit concentration the vapor may be discharged into the atmosphere or otherwise discarded. However, where the present apparatus and method is utilized for the concentration of other liquids, the vapor content may be of value and salvage operations may be employed.

It should be noted that, particularly with respect to citrus juice concentration, the pressure in the chamber 10 is to remain substantially that of atmospheric pressure. Hence, air may be admitted to compensate for the suction of pump 50. This may be accomplished by admission through conduit 69 with the fresh juice or independently thereof. Obviously, those skilled in the art may employ other means for the appropriate admission of air and maintenance of desired pressure in chamber 10.

With respect to the operation of chamber 10 for the concentration of citrus juices and/or a wide variety of other liquids, that operation may be complete in itself and a liquid of sufficient concentration may be drawn off through the valve 53. It will thus be understood that the present inventive concept, both as to method and apparatus is fully disclosed from the foregoing and without respect to the chamber 11. However, it has been found that by the use of the associated chamber 11, or an equivalent means such as a conventional flash chamber, a final concentrate of a higher degree of concentration may result.

Thus, in the present total arrangement, the liquid from the chamber 10 is drawn off through the valve 53 and conduit 52 to be delivered to the sealed chamber 11. In the chamber 11 sub-atmospheric pressure is maintained by the vacuum pump 61 drawing vapors from the dome of chamber 10 through conduit 54 and condensation vapor chamber 55 with its baffle 56. The pump 61 is connected at the upper end of the vapor chamber 55 through conduit 60. Cooling condensation water is admitted to the vapor chamber 55 as indicated by the arrows at the upper right-hand side of FIGURES 1 and 2 and may be withdrawn by the water pump 57 connected with the lower end of the chamber.

The chamber 11 by virtue of the maintenance of reduced atmospheric pressure constitutes a flash chamber for vaporizing constituents of the liquid to be removed from the preliminarily concentrated liquid delivered from the chamber 10. As noted, the agitation means of chamber 11 may be identical with that disposed within the chamber 10 and the vaporization affected thereby will be similar but enhanced by the reduced atmospheric pressure.

The finally reduced liquid may be withdrawn from the chamber 11 through conduit 64 by action of the pump 65. If a greater degree of concentration is desired a re-cycling of the concentrate from chamber 11 may be effected by a return to chamber 10 through the conduit 68, or if desired, only a portion of the concentrate from the chamber 11 may be re-cycled. The final concentrate wil be delivered from the apparatus through the discharge line 67.

From the foregoing, it will be seen that the present invention povides a novel and improved method for the concentration of liquids without the application of external heat and by the internal generation of heat through mechanical moving parts. The present apparatus is designed and eminently suited for the practice of the method. It will be seen that the method takes advantage of the dual phenomena of reduced pressure behind the movement of a rigid body in a liquid body together with temperature elevation by skin friction or its equivalent as the rigid body moves through the liquid body. Hence in one aspect of the invention a new and improved evaporator is produced and a new and improved method of evaporation. Of particular significance is the practice of the method and the operation of the device in the concentration of citrus fruit juices whereby localized temperature and pressure conditions produce localized vaporization in a constantly turbulent and moving body of liquid to effect a minimization of enzyme reaction in pectin reaction.

Obviously, the invention is in no way limited either to the structural details of the apparatus presented nor to any specific application of the inventive concept of the method. Therefore, numerous changes, modifications and the full use of equivalents may be resorted to without departure from the spirit or scope of the invention, as outlined in the appended claims.

What I claim is:

1. The method of concentrating liquids which consists essentially of the steps of subjecting the liquid to vigorous agitation to increase the temperature thereof and produce a fluid vapor and withdrawing said vapor from the body of the liquid.

2. The method of concentrating one particular liquid constituent of a liquid, which consists essentially of the steps of vigorously agitating the liquid to increase the temperature thereof and produce a vapor of another constituent of the liquid and withdrawing said vapor from the remaining body of the liquid.

3. The method of concentrating citrus juice without the application of external heat which consists essentially of the step of agitating the juice to increase the temperaure thereof and form a water vapor therefrom and withdrawing such water vapor.

4. A method of evaporating liquids, which consists essentially of the steps of subjecting a body of liquid to the effect of a moving solid body to produce a zone of reduced pressure in the liquid in the wake of said moving solid body said moving solid body further producing increased temperature in said zone resulting from the friction induced by movement of the solid body in the liquid body, and withdrawing vapor produced thereby.

5. The method of concentrating liquids by the removal of the more readily volatile constitutents thereof, which consists essentially of the steps of subjecting the liquid to the rapid rotation of an agitator whereby the pressure of the liquid in the wake of the agitator is reduced, while the temperature of the liquid in said wake is elevated by the friction of said agitator moving through said liquid, whereby the effect of said combined increase of temperature and reduction of pressure in said wake will volatilize at least some of the liquid therein, and withdrawing the volatilized portion of the liquid.

6. The method of concentrating liquid by removing a low boiling point constituent comprising introducing the liquid into a first housing, agitating the liquid in the first housing to raise its temperature to a point substantially below the boiling point of the constituent, introducing air into said housing and causing its rapid withdrawal therefrom thereby entraining vaporous constituents, flowing such partially concentrated and heated liquid from below the liquid level in the first housing into a second housing maintained at a lower pressure, agitating the liquid in the second housing, withdrawing vapors from the upper portion of the second housing, withdrawing concentrated liquid from below the liquid level in the second housing and said withdrawn concentrated liquid from said second housing back to the inlet of said first housing until the liquid withdrawn from said second housing has attained the desired concentration.

7. The method of concentrating liquid by removing a low boiling point constituent comprising introducing the liquid into a first housing, agitating the liquid in the first housing to raise its temperature to a point substantially below the boiling point of the constituent, introducing air into said housing and causing its rapid withdrawal therefrom thereby entraining vaporous constituents, flowing such partially concentrated and heated liquid from below the liquid level in the first housing into a second housing maintained at a lower pressure, agitating the liquid in the second housing, withdrawing vapor from the upper portion of the second housing and withdrawing concentrated liquid from below the liquid in the second housing.

8. The method of evaporating a liquid comprising placing such liquid in a housing generally maintained at ambient temperature, violently agitating the liquid in such manner that its temperature becomes substantially higher as a result of such agitation, and withdrawing the vapors of such liquid from above the level of said liquid within the housing.

References Cited

UNITED STATES PATENTS 2,944,600  7/1960  Tobey _____ 159—25

A. LOUIS MONACELL, *Primary Examiner.*

M. VOET, *Assistant Examiner.*